United States Patent Office 3,560,554
Patented Feb. 2, 1971

---

3,560,554
ALKYLAMINOALKYL ETHERS OF CYCLOALKANOL
Zoltán Budai, László Pallos, Endre Komlós and Lujza Erdélyi, née Petöcz, Budapest, Hungary, assignors to Egyesult Gyogyszer-es Tapszergyar, Kereszturi ut, Budapest, Hungary
No Drawing. Filed June 30, 1967, Ser. No. 650,187
Claims priority, application Hungary, July 6, 1966, EE-1,284
Int. Cl. C07c *125/06*
U.S. Cl. 260—471  5 Claims

---

ABSTRACT OF THE DISCLOSURE

Compounds of the formula

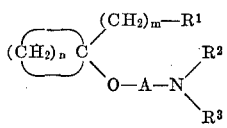

and their pharmaceutically acceptable acid addition salts, wherein $R^1$ is hydrogen, phenyl or monochlorophenyl, $R^2$ is alkyl having from 1 to 4 carbon atoms, $R^3$ is hydrogen or —$COOR^4$, $R^4$ is lower alkyl, A is alkylene having from 2 to 4 carbon atoms, $n$ is an integer from 4 to 6, and $m$ is an integer from 0 to 8.

---

This invention relates to new derivatives of alkylaminoalkyl ethers of cycloalkanol and their salts. Furthermore, the invention relates to a new process for preparing ethers of this type.

From the basic ethers of teritary alcohols, the 1-phenyl-cyclohexyl ethers having weak antihistaminic effect are known (Chem. Listy 42, 175 /1948/). Moreover, the alkyl ethers containing basic organic groups of 1-phenyl-cycloalkanols and 1-benzyl-cycloalkanols are also known, these compounds having mainly antiparkinsonic effect and, on the basis of recent investigations, a blocking effect on the central nervous system (German Pats. 1,090,201; 1,094,738; 1,096,347 and 1,110,155).

On the basis of previous investigations we have published that the basic ethers of 1-aryl-, 1-aralkyl- and 1-alkyl-cycloalkanols, in contradistinction of the above-cited literature data, have mainly spasmolytic, tranquillizing, peripheral vasodilator, local anesthetic and anti-ulcer effects, and show slight or no antiparkinsonic effect. The alkyl ethers of this type containing basic groups can be synthetized in a known way by the aid of the Williamson method or by using reactive esters, such as mesyl and tosyl esters. Generally, the etherification can be carried out without difficulties but, due to the high amount of side products, the preparation of the monoalkylaminoalkanols and alkylhaloids, resp., used as starting materials, can be carried out only with extremely low (15–20%) yields. According to the present invention there is provided a new process for preparing basic ethers of this kind.

The invention relates to the monoalkylaminoalkyl ethers of cycloalkanol having the general Formula I

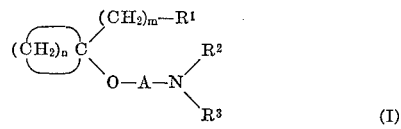

wherein $R^1$ is selected from the group consisting of hydrogen, phenyl and monohalophenyl, $R^2$ is selected from the group consisting of straight and branched alkyl radicals having from 1 to 4 carbon atoms, preferably methyl and ethyl radicals, $R^3$ is selected from the group consisting of hydrogen and —$COOR^4$, $R^4$ being lower alkyl, preferably methyl or ethyl, A is selected from the group consisting of straight and branched alkylene radicals having from 2 to 4 carbon atoms, $n$ is an integer higher than 3 and lower than 7, and $m$ is an integer higher than $-1$ and lower than 9.

In compliance with the process according to the invention, the compounds having the general Formula I can be prepared simply and with good yields by reacting an ether having the general Formula II

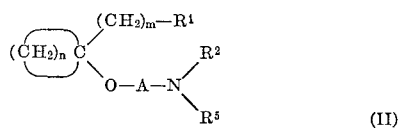

wherein $R^1$, $R^2$, A, $m$ and $n$ have the same meanings as above and $R^5$ is selected from the group consisting of straight and branched alkyl radicals having from 1 to 4 carbon atoms, with a chloroformic alkylester having the general Formula III

$$Cl—COO—R^4 \qquad (III)$$

wherein $R^4$ stands for lower alkyl, preferably methyl or ethyl radicals, whereafter the obtained carbalkoxy compound having the general Formula I, wherein $R^1$, $R^2$, A, $m$ and $n$ have the same meanings as above, and $R^3$ is —$COOR^4$, $R^4$ being as above, is saponified, if desired, in a known way to a compound having the general Formula I, wherein $R^3$ is hydrogen.

The ethers having the general Formula II and the esters having the general Formula III are suitably reacted in an apolar solvent, preferably benzene, at boiling temperature.

The formic ester having the general Formula III is preferably chloroformic ethylester.

The saponification of the carbalkoxy compound having the general Formula I, wherein $R^3$ is —$COOR^4$, can be generally carried out in a polar solvent, preferably in an alcoholic medium containing an alkali, preferably KOH.

The ether compounds having the general Formula I can be purified by distillation, preferably by fractional distillation in vacuo.

The new compounds of the general Formula I possess basic properties and form acid addition salts. If it is desirable to obtain the acid salt from the free base, the salt can be prepared by reacting the free base with the corresponding inorganic or organic acid, such as hydrochloric, hydrobromic, maleic, fumaric, ethansulphonic, 1,1'-methylene-bis(2-naphthol-3-carboxylic), sulphuric, phosphoric, acetic, citric and other pharmaceutically acceptable acids, preferably in the presence of a suitable solvent permitting isolation of the salt.

On the other hand, if it is desired to convert the acid salt to the free base, this can be accomplished by dissolving the salt in a suitable solvent, neutralizing the solution with a basic material, such as sodium hydroxide and the like, and isolating the desired base by extraction or other suitable means.

The invention includes all the stereoisomers and stereoisomeric mixtures of the compound of the general Formula I, including also their pharmaceutically acceptable acid addition salts.

The compounds according to the invention possess valuable pharmacological properties. They show a spasmolytic effect which is lower than that of the known 1-substituted cycloalkanol-dialkylaminoalkyl ethers. At the same time the compounds according to the invention show more pronounced tranquillizing and sedative effects.

The compounds of the general Formula I as well as their acid salts can be transformed to pharmaceutically usable products by adjusting them alone or combined with other biologically active compounds, if desired, together with carriers, binding, filling, surface-active, flavouring, etc. agents usable in the pharmaceutical industry, in a known way, to medicines.

The invention is further illustrated by the aid of the following examples, which are given for the purpose of illustration only and are not to be construed as limit of invention in spirit or in scope.

EXAMPLE 1

To a solution of 57.9 g. (0.2 mole) of 1-benzyl-1-(3'-dimethylaminopropoxy)-cycloheptane in 100 ml. of absolute benzene a solution of 65 g. (0.6 mole) of chloroformic ethylester in 60 ml. of absolute benzene is dropped while boiling and the reaction mixture is boiled until the evolution of methylchloride is ceased. Thereafter the solution is evaporated and the residue fractionated under vacuum.

Yield: 59.2 g. (85.3%); B.P.: 216° C./5 torr.; $n_D^{20}=1.5138$.

Analysis data for $C_{21}H_{33}NO_3$ (347.478).—Calculated (percent): C, 72.59; H, 9.57; N, 4.03. Measured (percent): C, 72.56; H, 9.44; N, 4.06.

41 g. (0.118 mole) of the thus-obtained 1-benzyl-1-[3'-(N - methyl - N - carbethoxy) - amino - propoxy] - cycloheptane and 47.2 g. (0.841 mole) of KOH are dissolved in 177 ml. of ethanol, refluxed for 10 hours and then evaporated to dryness on a water bath. The residue is dissolved in 150 ml. of water. The oily layer is separated and then fractionated in vacuo. The 1-benzyl-1-(3'-methylaminopropoxy)-cycloheptane obtained in this way weighs 30 g. (92.3%); B.P.: 166° C./2 torr.; $n_D^{20}=1.5230$.

Analysis data for $C_{18}H_{29}NO$ (275.438).—Calculated (percent): C, 78.6; H, 10.61; N, 5.08. Measured (percent): C, 78.85; H, 10.08; N, 5.02.

The salt formed with fumaric acid has a melting point, after recrystallisation from the mixture of acetone and ethanol, of 129–130° C.

EXAMPLE 2

To a hot solution of 29.6 g. (0.1 mole) of 1-p-chlorophenyl - 1 - (2' - methyl - 3' - dimethylamino - propoxy)-cyclopentane in 50 ml. of absolute benzene, 32.5 g. (0.3 mole) of chloroformic ethylester diluted previously with 30 ml. of absolute benzene are dropped. After 10 hours of boiling, the solvent is distilled off and the residue is fractionated under vacuum.

Yield: 29.7 g. (84%); B.P. 200° C./1.75 torr.; $n_D^{20}=1.5136$.

Analysis data for $C_{19}H_{28}ClNO_3$ (353.898).—Calculated (percent): C, 64.6; H, 7.98; Cl, 10.0; N, 3.96. Measured (percent): C, 64.4; H, 7.94; Cl, 10.1; N, 3.81.

22 g. (0.0622 mole) of the thus-prepared 1-p-chlorophenyl - 1 - [2' - methyl - 3' - (N - methyl-N-carbethoxy)-aminopropoxy]-cyclopentane and 25 g. (0.445 mole) of KOH are dissolved in 90 ml. of 96% ethanol and refluxed for 10 hours. The solution is cooled to room temperature, poured into 300 ml. of water and extracted with 100 ml. of ether in three portions. The combined solutions containing ether are washed with water until neutral, dried on $MgSO_4$ and evaporated. The residue is fractionated in vacuo. The obtained compound is 1-p-chlorophenyl-1-(2'-methyl-3'-methylaminopropoxy)-cyclopentane.

Yield: 15 g. (85.7%); B.P.: 148° C./0.5 torr; $n_D^{20}=1.5221$.

Analysis data for $C_{16}H_{24}ClNO$ (281.833).—Calculated (percent): C, 68.4; H, 8.57; Cl, 12.6; N, 4.96. Measured (percent): C, 68.2; H, 8.4; Cl, 12.55; N, 5.0.

Melting point of the fumarate salt: 126–127° C. (acetone).

EXAMPLE 3

To a solution of 45 g. (0.1385 mole) of 1-octyl-(2-diethylamino-ethoxy)-cycloheptane in 90 ml. of anhydrous benzene free from water, 38.5 g. (0.4155 mole) of chloroformic ethylester previously dissolved in 40 ml. of absolute benzene are dropped. The reaction mixture is boiled for 7.5 hours, whereafter the solution is evaporated and the residue fractionated in vacuo.

Yield: 38.4 g. (75%); B.P.: 170° C./0.6 torr.; $n_D^{20}=1.4677$.

Analysis data for $C_{22}H_{43}O_3N$ (369.594).—Calculated (percent): C, 71.6; H, 11.7; N, 3.79. Measured (percent): C, 71.8; H, 11.8; N, 3.85.

11 g. (0.0298 mole) of the thus-obtained 1-octyl-1-[2'-(N - ethyl - N - carbethoxy) - aminoethoxy] - cycloheptane are refluxed for 16 hours with 66 ml. of n-butanol containing 22% of sodium hydroxide. Thereafter the butanol is distilled off and the residue dissolved in 150 ml. of water. The aqueous solution is extracted with 90 ml. of benzene in 3 portions. The combined solutions containing benzene are washed with water until neutral and evaporated. The thus-obtained product is 1-octyl-1-(2'-ethylamino-ethoxy)-cycloheptane.

Yield: 7.47 g. (84.5%).

EXAMPLE 4

A solution of 7.47 g. (0.0251 mole) of the 1-octyl-1-(2'-ethylamino-ethoxy)-cycloheptane, obtained according to Example 3, in 15 ml. of ethanol is added to a hot solution of 2.73 g. of fumaric acid in 50 ml. of water. After cooling the fumarate salt crystallises out. The crystals are filtered and washed with a small amount of 30% ethanol.

Yield: 9 g. (90.5%); M.P.: 53.54° C. (monohydrate).

Analysis data for $C_{23}H_{43}NO_5$ (413.605) (without water of crystallization).—Calculated (percent): C, 67.0; H, 10.45; N, 3.83. Measured (percent): C, 67.1; H, 10.35; N, 3.8.

What we claim is:

1. Compounds selected from the group consisting of compounds of the formula

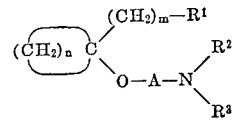

wherein $R^1$ is selected from the group consisting of hydrogen, phenyl and monochlorophenyl, $R^2$ is selected from the group consisting of straight and branched alkyl having from 1 to 4 carbon atoms, $R^3$ is selected from the group consisting of hydrogen and $-COOR^4$, $R^4$ is lower alkyl, A is selected from the group consisting of straight and branched alkylene having from 2 to 4 carbon atoms, $n$ is an integer from 4 to 6, and $m$ is an integer from 0 to 8, and pharmaceutically acceptable acid addition salts thereof.

2. 1-benzyl-1-(3'-methylamino-propoxy)-cycloheptane.

3. 1 - benzyl - 1 - [3' - (N - methyl - N - carbethoxy)-aminopropoxy]-cycloheptane.

4. 1 - p - chlorophenyl - 1 - (2' - methyl - 3' - methyl-aminopropoxy)-cyclopentane.

5. 1 - p - chlorophenyl - 1 - [2' - methyl - 3' - (N-methyl-N-carbethoxy)-aminopropoxy]-cyclopentane.

References Cited

Finar, I. L., Organic Chemistry, vol. I, published by Richard Clay & Co., Ltd.—Bungay, Suffolk, p. 382 relied on.

LORRAINE A. WEINBERGER, Primary Examiner

L. A. THAXTON, Assistant Examiner

U.S. Cl. X.R.

260—468, 501.17, 563, 570.5, 999